(12) United States Patent  
Ishida et al.

(10) Patent No.: US 7,472,122 B2  
(45) Date of Patent: Dec. 30, 2008

(54) COMPUTER SYSTEM AND METHOD FOR MANAGING FILE VERSIONS

(75) Inventors: Manabu Ishida, Yokohama (JP); Akiyoshi Hashimoto, Kawasaki (JP); Tetsuya Uemura, Sayama (JP)

(73) Assignee: Hitachi, Ltd., Tokyo (JP)

( * ) Notice: Subject to any disclaimer, the term of this patent is extended or adjusted under 35 U.S.C. 154(b) by 591 days.

(21) Appl. No.: 11/021,980

(22) Filed: Dec. 23, 2004

(65) Prior Publication Data

US 2006/0101092 A1    May 11, 2006

(30) Foreign Application Priority Data

Nov. 9, 2004    (JP)    ............... 2004-324889

(51) Int. Cl.  
*G06F 17/30* (2006.01)
(52) U.S. Cl. ................. 707/8; 707/6; 707/205
(58) Field of Classification Search ........... None  
See application file for complete search history.

(56) References Cited

U.S. PATENT DOCUMENTS 5,623,659 A * 4/1997 Shi et al. ............ 707/8  
6,098,079 A * 8/2000 Howard ............ 707/205  
6,289,356 B1    9/2001 Hitz et al.

OTHER PUBLICATIONS

Bovet et al. "The Ext2 and Ext3 Filesystems," in *Understanding the Linux Kernel* 2nd Edition, Ch. 17, pp. 574-607 (Dec. 2002).

* cited by examiner

*Primary Examiner*—Charles Rones  
*Assistant Examiner*—Belix M Ortiz  
(74) *Attorney, Agent, or Firm*—Townsend and Townsend and Crew LLP

(57) ABSTRACT

The version management method according to the present invention by a computer system comprises a repository server 2 and a user terminal 1. The repository server 2 executes a procedure that the file to be updated within the user repository 26 are updated by the user terminal 1, a procedure that the files to be updated within the user repository 26 are updated so as to write the files to be updated on the system repository 22, and a procedure that the file to be updated within the system repository 22 are read by the arbitrary user terminal 1.

1 Claim, 15 Drawing Sheets

FIG. 1
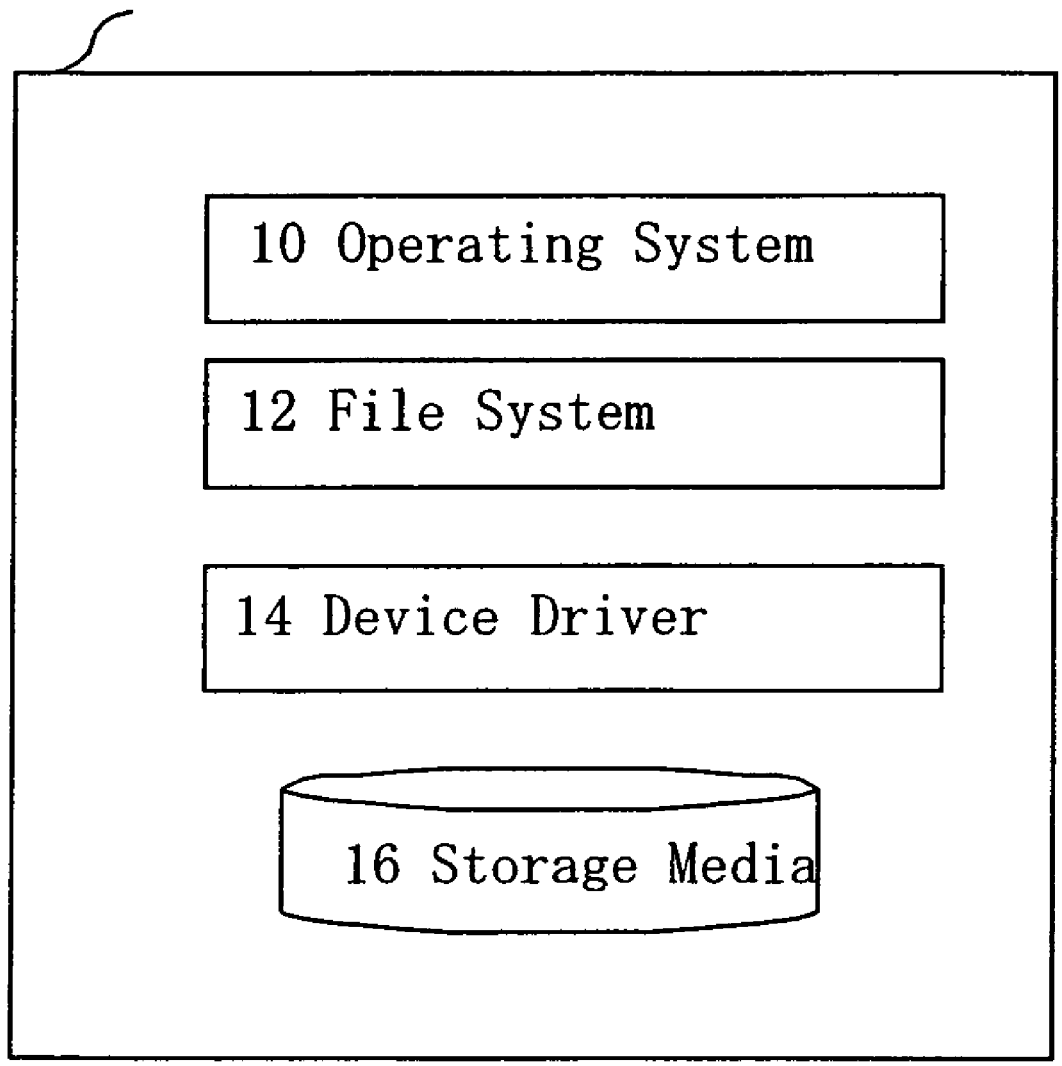
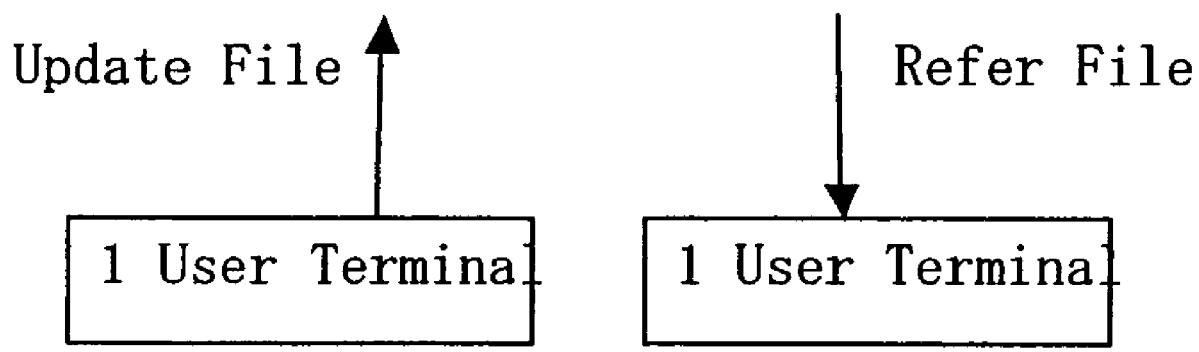

FIG. 3A

| Accessed To User/System | File ID | Version ID |
|---|---|---|
| User X | File A | 1 |

FIG. 3B

| Accessed To User/System | File ID | Version ID |
|---|---|---|
| System | File A | 1 |
| User X | File A | 1 |

FIG. 3C

| Accessed To User/System | File ID | Version ID |
|---|---|---|
| System | File A | 1 |
| User X | File A | 2 |

FIG. 3D

| Accessed To User/System | File ID | Version ID |
|---|---|---|
| System | File A | 1 |
| User X | File A | 3 |

FIG. 3E

| Accessed To User/System | File ID | Version ID |
|---|---|---|
| System | File A | 3 |
| User X | File A | 3 |

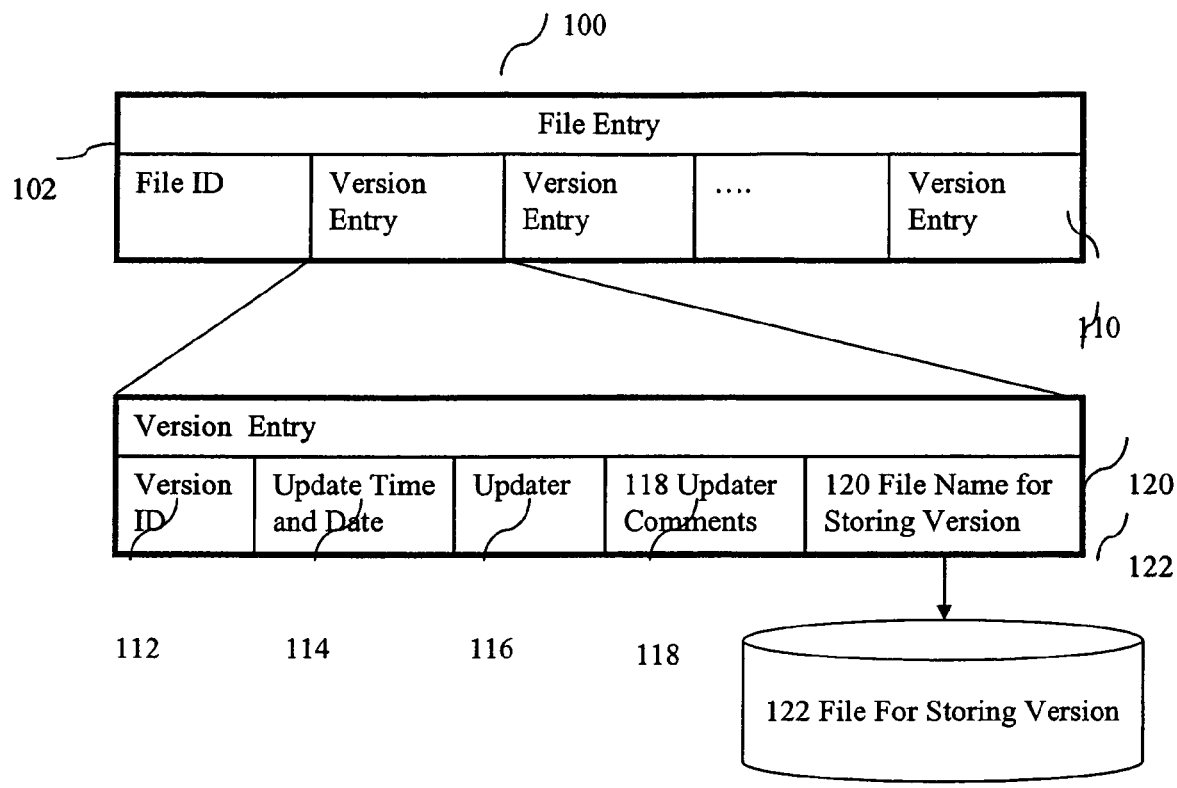

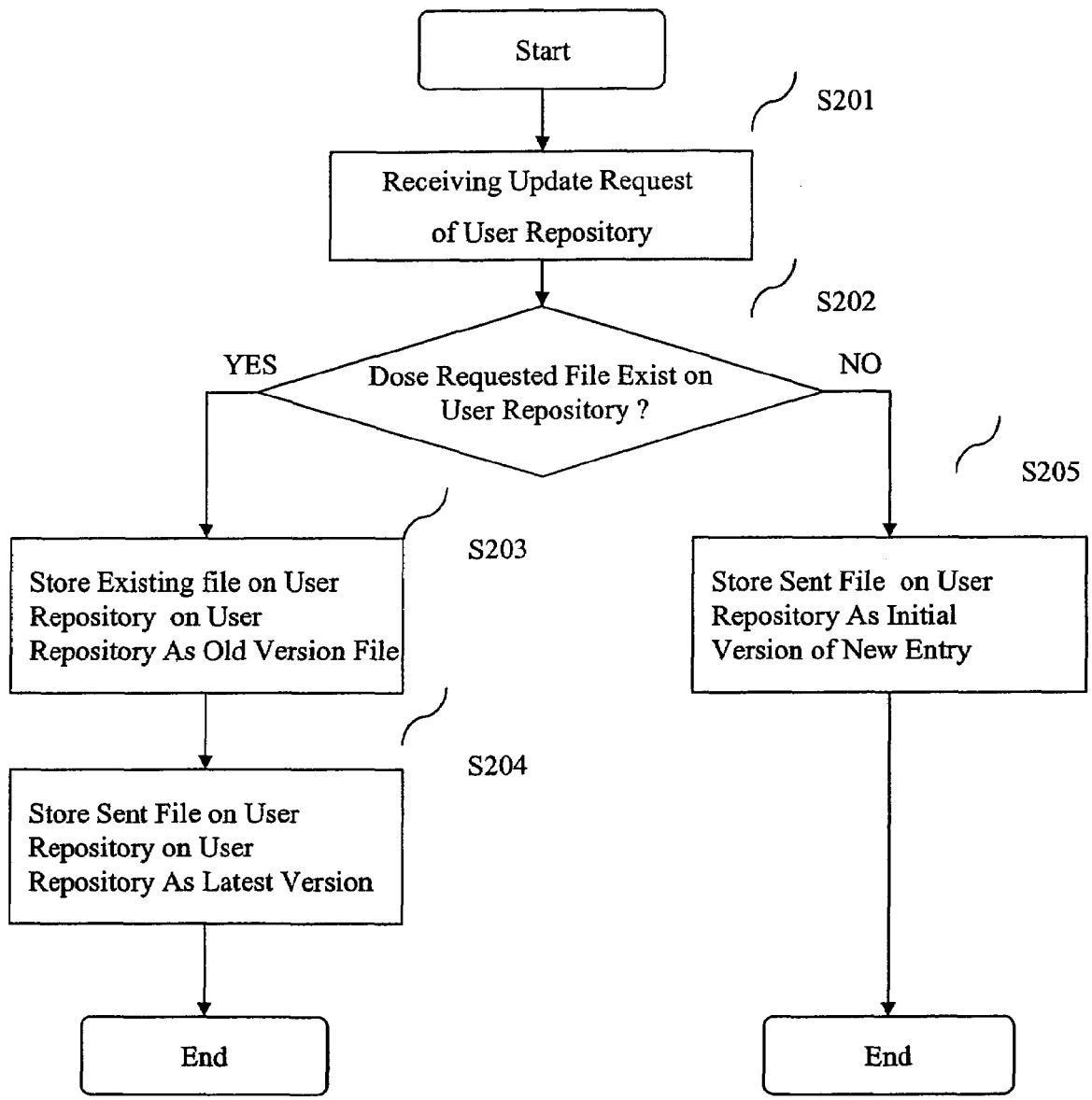

FIG. 8A

| Accessed To User/System | File ID | Version ID | File Name for Storing Version | Remarks |
|---|---|---|---|---|
| System | /foo/File A | 1.1 | /System /file A0001 | |

FIG. 8B

| Accessed To User/System | File ID | Version ID | File Name for Storing Version | Remarks |
|---|---|---|---|---|
| System | /foo/File A | 1.1 | /System /file A0001 | |
| User X | /foo/File A | 1.1 | /User X /file A0002 | Copy file A0001 |

FIG. 8C

| Accessed To User/System | File ID | Version ID | File Name for Storing Version | Remarks |
|---|---|---|---|---|
| System | /foo/File A | 1.1 | /System /file A0001 | |
| User X | /foo/File A | 1.2 | /User X /file A0002 | Edit file A0002 |

FIG. 8D

| Accessed To User/System | File ID | Version ID | File Name for Storing Version | Remarks |
|---|---|---|---|---|
| System | /foo/File A | 1.1 | /History Management /file A0001 | Move from /System |
| System | /foo/File A | 1.2 | /System /file A0003 | Copy file A0002 |
| User X | /foo/File A | 1.2 | /User X /file A0002 | |

FIG. 11A

22 System Repository

| File Name | Explanation | Access Authority |
|---|---|---|
| / | Root Directory of System Repository | Readable by All Users |
| /File A002 | File to be updated on System Repository (indicates file name of file A0002) | Readable by All Users |
| /.old/ | Root Directory For Storing History of System Repository | Readable/Writeable by System Repository Updating Module |
| /.old/file A001 | File to be Updated For Storing History on System Repository (indicates file name of file A0001) | Readable/Writeable by System Repository Updating Module |

FIG. 11B

26 User Repository

| File Name | Explanation | Access Authority |
|---|---|---|
| /.shadow | Root Directory of User Repository | |
| /.shadow/X/ | Root Directory of User Repository of User X | Readable/Writeable only by User X |
| /.shadow/X/file A002 | File to be updated on User Repository of User X (indicates file name of file A0002) | Readable/Writeable only by User X |
| /.shadow/X/.old/ | Root Directory For Storing History of User Repository of User X | Readable/Writeable by User Repository Updating Module |
| /.shadow/X/.old/file A001 | File to be updated on User Repository of User X (indicates file name of file A0001) | Readable/Writeable by User Repository Updating Module |
| /.shadow/Y/ | Root Directory of User Repository of User Y | Readable/Writeable only by User Y |
| /.shadow/Y/file A002 | File to be updated on User Repository of User Y (indicates file name of file A0002) | Readable/Writeable only by User Y |

COMPUTER SYSTEM AND METHOD FOR MANAGING FILE VERSIONS

BACKGROUND OF THE INVENTION

1. Field of the Invention

The present invention relates to a computer system and method for managing file version, application of which is based on Japanese Patent Application No. 2004-324889, which is incorporated herein by reference.

2. Description of Related Art

When a file such as a program file, a document file, a drawing file or such is continuously edited, if an editor such as a developer manages updated history, works, which should be done by the editor, are unduly increased. For this reason, means have been suggested where works, in which contents of file updating are managed as an update history, and a history at a voluntary time is loaded, are executed by a computer.

For example, CVS (Concurrent Versions System) is software for managing file versions. A single computer (CVS server) on which the CVS program is running, is preparing a storage area so called repository at which files sent from a plurality of users are stored.

A user issues a command inherent to CVS to the CVS server in order to load a file from the repository or store a file onto the repository. When the user requests a file update to the CVS server, the CVS server stores a difference in a past file as a history to the repository without erasing the past file. Upon issuing a request to the CVS server, the user can always load a file stored into the repository as a history.

However, in order to realize the version management through CVS, the user must learn how to use CVS and must issue a command inherent to CVS to instruct the storage of history to the computer. Consequently, cost should be required for learning commands inherent to CVS. For this reason, a technique has been suggested, which shows a user no command inherent to CVS and allows the user for indirectly operating CVS from an interface familiar with the user.

As one example of indirect operation of CVS, Nanjing, China discloses a technique having CVS taken in an operating system (Nanjing, China: "An Adaptive Version-Controlled File System", Proceedings of The Forth International Symposium on Future Software Technology (ISFST'99), pp. 36-41, Oct. 27-29, 1999, disclosure of which is incorporated herein by reference). According to this technique, a computer having a request for file operation received from a user performs the file operation as well as performs demand for issuing version management. By the virtue of such a version management a user can keep a file history only by storing the file. This ensures the user for keeping the file history without any user's load.

As another example of indirect operation of CVS, U.S. Pat. No. 6,289,356 discloses a file system technique in which when a user updates a file, the original file data is not overwritten but a new file data is always written on another storage area, the disclosure of which is incorporated herein by reference. According to this technique, all of the reference information managed by the computer are periodically stored as a history. The file system stores the file data and reference information to the file on storage media. As long as the reference information to the file exists, the file system does not delete the file data for which the reference information is referred and, thus, storage of all reference information, the file data can be kept.

Such a file system can ensure the user for keeping the file history without consciously keeping the file history. Also, the computer only copies the reference data to the file, whereby an amount of copying data can be reduced in comparison with copying the file itself, making it possible to rapidly store the history.

However, the conventional management techniques of the updated history are not suitable for applications in which a plurality of users are cooperated to perform works of edition in the case where a group of files having consistent meaning are edited by a plurality of users, such as a case where a plurality of software developers develop one software and a case where a large size of drawing are designed by a plurality of designers.

For example, considering the following case. Developer A updates Program C under developing to a repository. In this case, Developer A does not wish to show other developers Program C, which has not yet been tested enough.

However, other developer B can load Program C by a usual repository access command. As a result, if Program C contains bags, Developer B consumes a time by these bags. The time consumption should be originally avoided if the intention of Developer A that does not show Program C is reflected on the repository.

A mechanism can be considered that adds the contents of update as a comment when the user updates the file, whereby the user, who has updated the file can notify other users the contents of updating the file. In the case where a plurality of users edit a file, which requires to have a consistent meaning, such as a program composed of a plurality of files, a user can modifies a file, which is edited by this user, in order to maintain the consistence with other files based upon the comment of updating the file.

However, the communication of the intention by means of comments is merely a text read by a person, and there is a possibility that the comment is composed of difficult-to understand or that the comment is not read due to carelessness of a reader. Consequently, there is a problem that contents of updating a file by a given developer is not notified to other developer and, thus, sufficient cooperation cannot be made among developers.

A main object of the present invention is, therefore, to provide means for managing updated history, which can make a communication of intension amongst users in an effective manner.

SUMMARY OF THE INVENTION

According to the present invention, there is provided a version management method by a computer system comprising a repository server, which stores files to be updated whose version is managed by a repository; a user terminal, which accesses the files to be updated. In the version management method according to the present invention, the repository comprises a user repository for managing files to be updated, which allows only a specific user terminal to be accessed provided per an individual user terminal and a system repository for controlling the files to be updated, which allows arbitrary user terminal(s) for accessing, and the repository server executes a procedure that the file to be updated within the user repository are updated by the user terminal, a procedure that the files to be updated within the user repository are updated by the user terminal so as to write the files to be updated on the system repository, and a procedure that the file to be updated within the system repository are read by the arbitrary user terminal(s). Other configuration will be found on the following description.

The present invention has a feature that the repository server controls the access of the user terminal so that the repository is divided into a user repository which is a private type provided per individual user, and the system repository which is public type. This makes it possible for the user to change the repository so that files not wished to be opened are updated onto the user repository and files wished to be opened are updated onto the system repository. Changing of the repository makes it possible to communication of intension among the users in much more effective manner.

BRIEF DESCRIPTION OF THE DRAWINGS

FIG. 1 shows a configuration of a computer system according to one embodiment of the present invention;

FIG. 3 shows contents of the repository in the outline of file update process according to one embodiment of the present invention;

FIG. 5 shows a data construction of the repository according to one embodiment of the present invention;

FIG. 6 shows one example of the configuration of history management table according to one embodiment of the present invention;

FIG. 7 is a flowchart showing update process of the user repository according to one embodiment of the present invention;

FIG. 8 shows change in update the history management table according to one embodiment of the present invention;

FIG. 11 shows a configuration of a file system where a system repository and a plurality of user repositories are allocated onto one file tree according to one embodiment of the present invention;

DESCRIPTION OF PREFERRED EMBODIMENTS

Figure 2:
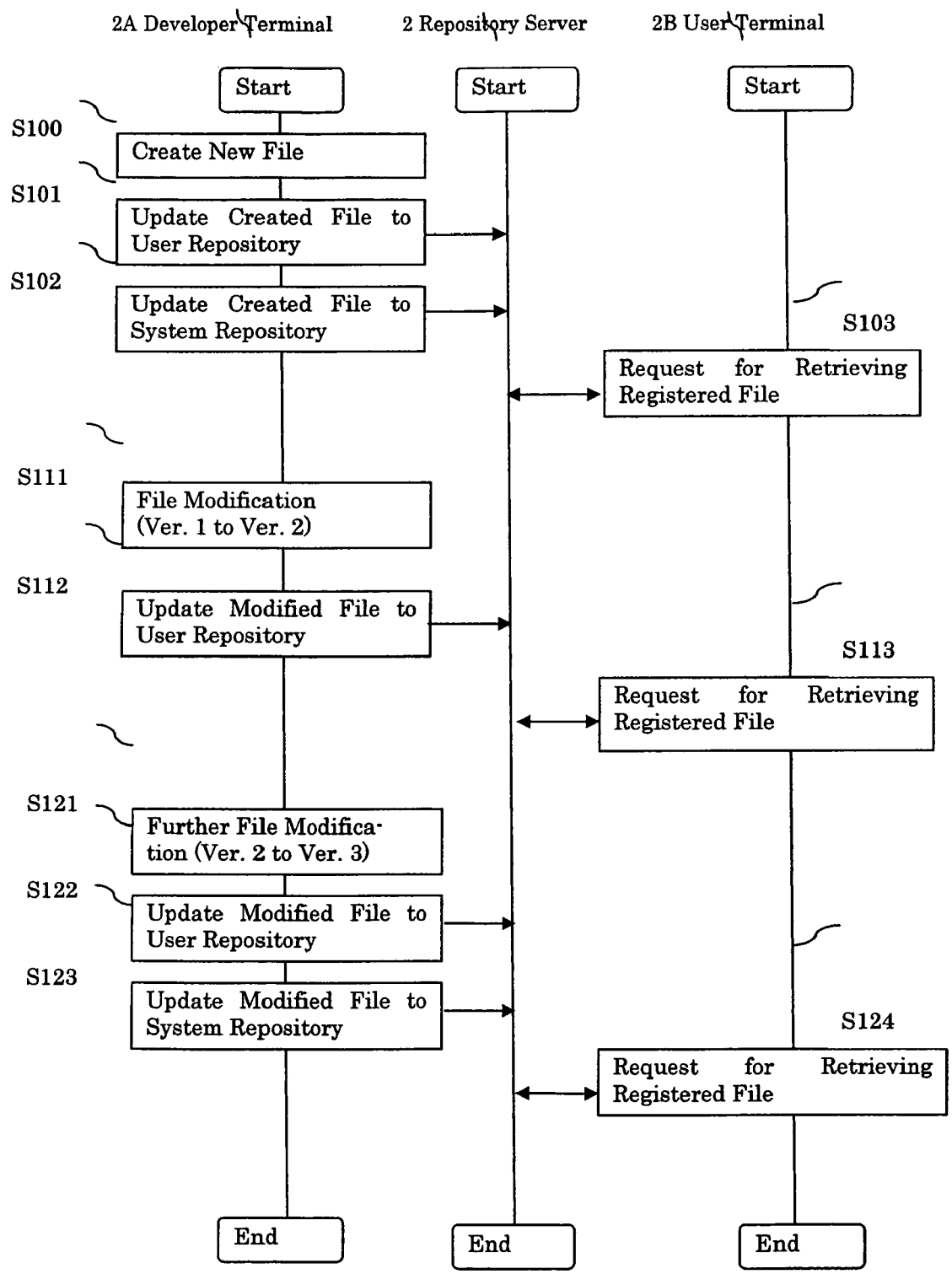
FIG. 2 is a flowchart showing an outline of file update process according to one embodiment of the present invention.

Embodiments of the present invention will now be described by referring to the attached drawings. FIG. 1 shows a configuration of a computer system according to one embodiment of the present invention.

A computer system comprises a plurality of user terminals 1, and a repository server 2. Each user terminal 1 is connected to the repository server 2 via a communication line. The user terminal 1 is a terminal, which is operated by a user for a version management system, and update and loading files are carried out via the user terminal 1. The repository server 2 provides the user a version management service.

Each of the user terminals 1 and the repository server 2 is composed of a computer system at least comprising a memory serving as memory means used when calculation is executed, and a processor executing the calculation. The memory may be composed of RAM (Random Access Memory) or such. The processor comprising CPU (Central Processing Unit) executes a program on the memory to realize the calculation.

Furthermore, each of the user terminals 1 and the repository server 2 possesses a user interface (not shown), which is inputting/outputting means, the user interfaces (at the side of the repository server 2) receiving a request from the user terminal 1 and sending the results of the request back to the user terminal 1. The user interface (at the side of the repository server 2) comprises, for example, a display, a keyboard, and communication devices for communication with the user terminal 1 via a network.

The repository server 2 also possesses an operating system 10 which intermediates the access of a file system 12, the file system 12, which recognizes the data stored on a disk as a unit of a file to the user terminal 1, a device driver 14, which executes the control command from the file system 12 to control the memory means, and storage media 16, which stores data required for providing the version management service. The repository, which will be described fully later on, is stored on the storage media 16.

Due to the file system 12, the user terminal 1 can access the target data only by specifying the file name without directly specifying the address of the data on the disk media. The file system 12 changes the file access command sent by the user terminal 1 into the control command inherent to the disk, which is given to the device driver 14.

The device driver 14, which can be used, may be SCSI (Small Computer System Interface) or ATA (AT Attachment) standard as command architecture inherent to the disk. The storage media 16 is composed, for example, of the disk (such as magnetic disk), but is not restricted thereto, and the storage media 16 may be composed not depending upon the type of the disk 16. By means of bit string on the storage media 16, the data is stored in the form of the file.

FIG. 2 is a flowchart showing an outline of file update process according to one embodiment of the present invention, and FIG. 3 shows contents of the repository in the outline of file updater process according to one embodiment of the present invention. Referring to FIG. 2 and FIG. 3, the outline of changing the two types of the repositories (system repository 22 and user repository 26; See FIG. 4) will be described. In convenience of the description, the user terminals 1 are distinguished between Developer terminal 2A (which is updating files) and User terminal 2B, (which is loading the updated files), but there is no functional difference between these terminals. Elements described on FIG. 2 will be described later on such as the description of FIG. 4.

Creation of an initial file (version 1) will be described. Developer terminal 2A creates a new file (S100). Subsequently, as shown in FIG. 3A, Developer terminal 2A updates the created file existing on the user repository 26 of the repository server 2 to the system repository 22 of the repository server 2 (S102). Furthermore, User terminal 2B requests for retrieving files registered on the repository server 2 (S103), whereon the repository server 2 finds the file (version 1) registered on the system repository 22 in S102, and provide the file to User terminal 2B.

Next, the modification of the file (version 2) will now be described. Developer terminal 2A modifies the version 1 file into the version 2 file (S111). Subsequently, as shown in FIG. 3C, Developer terminal 2A then updates the modified version 2 file to the user repository 26 of the repository server 2 (S112). Here, it is considered that, for example, since fault is found in the modified version 2 file, the modified version 2 file is not updating to the system repository 22.

User terminal 2B requests for retrieving the files registered on the repository server 2 (S113), whereon the repository server 2 finds the file (version 1) registered on the system repository 22 in S102, and provide the file to User terminal 2B. Specifically, the version 2 file registered on the user repository 26 in S112 has not yet been registered on the system repository 22 and, thus, User terminal 2B is inhibited to load this file by means of the access control of the repository server 2.

Subsequently, further modification of the file (version 3) will be described. Developer terminal 2A modifies the version 2 file into the version 3 file (S121). Subsequently, as shown in FIG. 3D, Developer terminal 2A then updates the modified version 3 file to the user repository 26 of the repository server 2 (S122). Furthermore, Developer terminal 2A updates the modified file to the system repository 22 of the repository server 2 (S123). Furthermore, the user terminal 2A requests for retrieving the files registered on the repository server 2 (S124), whereon the repository server 2 finds the file (version 3) registered on the system repository 22 in S123, and provide the file to User terminal 2B As described above, the repository server 2 possesses the user repository 26 for a user for updating a file, which is for a specific user and which can only be accessed by the specific user, and the system repository 22, which can be referred by all of the users. The file update updated by the specific user (Developer terminal 2A) comprises two stage updating, one of which is a first stage updating a file to the user repository 26, and the other of which is a second stage updating a file, having being updated to the user repository 26 in the first stage, to the system repository 22.

Figure 4:
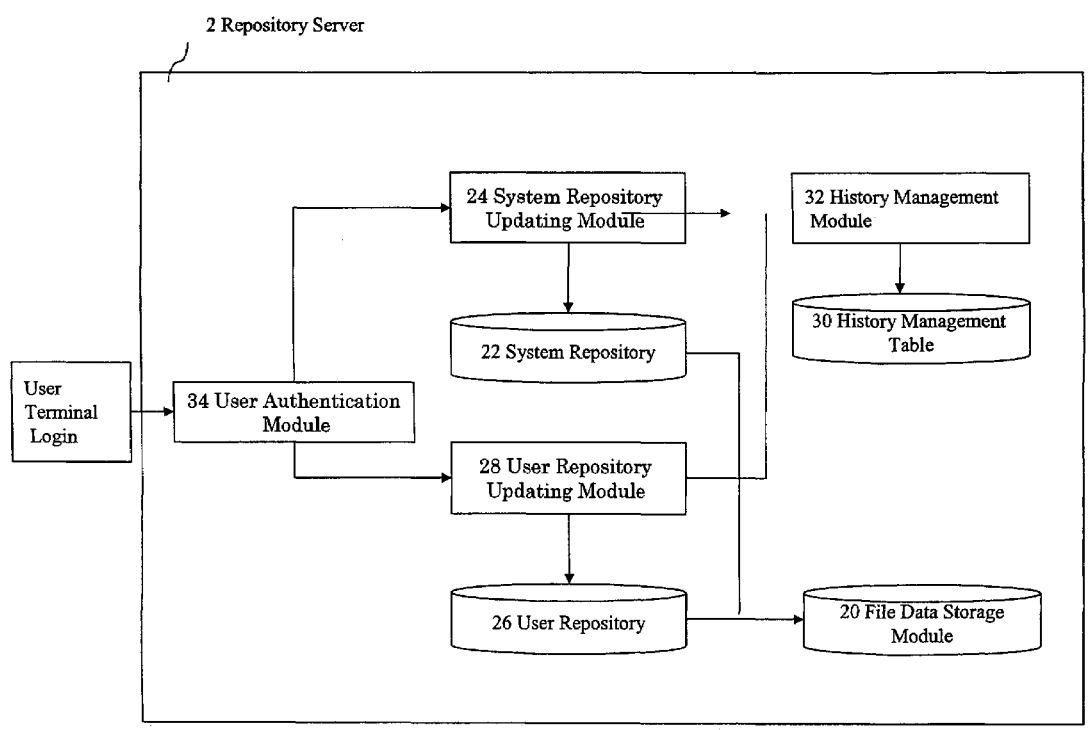
FIG. 4 shows a configuration of a repository server according to one embodiment of the present invention.

FIG. 4 shows a configuration of the repository server 2. The repository server 2 comprises a file data storing module 20, which stores contents of updated file in order to store file update history; the system repository 22, which stores information of update history of all files, which is opened to all of users and which is subject matters of update; a system repository updating module 24, which reflects a temporary updating a file stored on the user repository 26 on the system repository 22; the user repository 26, which manages information for the history of file update in an area for a temporary update allocated per a user; and a user repository updating module 28, which only allows the specific user oneself to access the temporary are allocated for the specific user so that other users cannot be accessed.

It is noted that when a given user terminal 1 update a file, the user repository updating module 28 stores the update file on a temporary area and control the disk access not so as to access the file by other users. Each record of the user repository 26 possesses a user ID in order to identify whose record is it. The user ID is imparted depending upon the accessed user.

In order to manage the file update history, the repository server 2 possesses a history management table 30, which associates files on the system repository 22 with files on the user repository 26, and a history management module 32, which receives request for operating a file sent from a user terminal 1, loads the file and its history depending upon the received request for operating a file, writes the file, and synchronizes the file with other user.

In order to restrict access a file depending upon the users, the repository server 2 also possesses a user authentication module 34, which authenticates the user terminal 1, and which has made an access request to determine the service for utilization. In the user authentication module 34, the authentication means are not specifically limited as long as they are the existing authentication means which allows the user terminal to input a set of a user ID and a password, and collates them with the set of a user ID and a password in the user account having been registered within the repository server 2.

FIG. 5 shows a data construction of the repository. The data construction shows individual repository constructions stored on the system repository 22 and the user repository 26. One file entry 100 corresponds to one file to be updated. When one file to be updated is updated in several times, one version entry 110 is created per one update. Consequently, one file entry 100 is composed of one or more version entry(ies) 110. In order to be distinguished from other file entry 100, each file entry 100 is allotted to a uniformized file ID 102. The file ID 102 is a file name composed, for example, of alphameric characters.

The version entry 110 includes the following information: The version entry 110 includes version ID 112, which identifies the file version uniquely, and is issued per version. The version entry 110 also comprises update time and date 114 showing update time and date, which expresses the time and date at the time of updating the file; an updater 116, which is information for identifying the user who updates the file uniquely (user ID, user name, etc.); an updater comment 118, which stores text information arbitrarily created by the updater; and a file name for storing a version 120, which associates the file name of that version with the version entry 110 uniquely. Here, the file name for storing a version 120 should have a file name different from the file names in other version entries 110, for preventing the confliction.

A file for storing a version 122, which can be referred from the file name for storing a version 120 of the version entry 110 is a file data corresponding to a specific version of the file. This file data may be a difference file from a different file for storing a version 122 having the same file 102 or a file containing all contents of data independent of other versions.

The history management table 30 is referred in order to allow the users for accessing different files for storing a version 122 of the version entry 110 having the same file ID 102. Even if a plurality of user edit the same file having the same file ID 102, the contents of the edition are stored on mutually different for storing a version 122 of the version entry 110. Consequently, since each of the users edits individual file for storing a version 122 different from each other, the contents of the edition of one user is never conflicted with the edition of other user.

FIG. 6 shows one example of the configuration of history management table 30. With regard to individual file update, the history management table 30 maintains the association among the file ID 102, the repository (system or specific user repository) to be stored, and the file name for storing aversion 120, which stores the contents of data of file update. Furthermore, even if the same file ID 102, differing the user differs the file to be updated. For example, file ID 102 "/foo/file A", version 4.3 exists on the system repository 22, and at the same time, it also exists on the user repositories 26 of User X and User Y. The file ID 102"/foo/file A", version 4.3 updated by User X is really a file "A002", and the file ID 102"/foo/file A", version 4.3 updated by User Y is really a file "A003". Specifically, even if the file is of the same ID 102 and the same version, the substances of the file updated by individual users are different. This makes it possible to edit a file by a plurality of uses in parallel without confliction.

File updating, which has described by referring to FIG. 2, will now be described in detail. Referring to FIG. 7, updating a file to the user repository 26 (S101, S112, and S122 in FIG. 2) will be described. The repository server 2 is the main of the processing is in FIG. 7. The updating a file to the user repository 26 indicates modification of the contents of the file, modification of information for the file and the like. Exemplifying commands of UNIX®, the updating a file to the user repository 26 corresponds to an operation that the file is altered by an editor, an operation that alters attribution of file by "chmod", and the like.

In the following description, the change in update of the history management table 30 shown in FIG. 8 will be referred as occasion may demand in order to describe the updating the file. It is considered that at an initial state one file to be updated exists on the system repository 22 as shown in FIG. 8A.

It should be noted that the repository server 2 controls accesses so that the user repository 26 ready for each of individual users can only be accessed by the specific user. Consequently, the user authentication module 34 possessed by the repository server 2 authenticates the user terminal 1, authorizes the access to the user repository 26 corresponding to the specific user, and inhibits access to any other user repositories 26 corresponding to other users. The following description is under precondition that the user accesses its own repository 26.

The repository server 2 receives an update request of the user repository 26 from Developer terminal 2A (S201). This update request includes the file ID 102, and also includes the contents of the file or information, which indicates the storage location of the contents of the file (such as a set of the file ID 102 and the version ID 112 stored on the system repository 22). Upon receiving the request, the repository server 2 makes retrieval whether or not the requested file exits on the user repository 26 (S202).

If the requested file has already existed (S202, YES), the file entry 100 of the file has already been produced. Consequently, in this case, one version entry 110 corresponding to update at this time is added. Specifically, the repository server 2 stores the existing file, which has been the latest version, as an old version on the user repository 26 (S203), and stores the sent file as an up-to-date version on the user repository 26 (S204). The files stored in S203 and S204 are files having versions different from each other and, thus, the file names should not be conflicted. For example, FIG. 8C shows one example where a new version entry 110 (version 1.2) is produced for the existing file entry 100.

When the data on the system repository 22 or the user repository 26 is updated, the history management module 32 reflects the update on the history management table 30.

The processes for updating the history management table 30 by the history management module 32 are as follows. The history management module 32 updates information concerning the correspondence between the version entry 110 created on the system repository 22 or the user repository 26 and the file name for storing a version 120 to the history management table 30. At the time of producing a new version entry 110, the history management module 32 sets a number higher than the old version ID 112 of the old file. Furthermore, the history management module 32 sets the time and date when being updated, and an identification data of the user, who has instructed the update, as for the updater 116. Also, the history management module 32 sets character string inputted by the user, who specifies the update, as for the updater comment 118. Finally, the history management module 32 sets a real file name of the updated latest file as for the file name for storing a version 120. The history management module 32 postscribes the version entry 110 set as just mentioned on the user repository 26.

On the other hand, if the requested file does not exist (S202, NO), no file entry 100 of the file has yet been produced on the user repository 26. Consequently, the repository file server 2 loads a file corresponding to the file ID 102, specified by Developer terminal 2A, and stores it as an initial version of a new entry on the user repository 26 (S205). In other words, the repository server 2 creates one new file entry 100 and one new version entry 110 belonging to this file entry 100. For example, FIG. 8B shows one example that a new file entry 100 and a new version entry 110 (version 1.1) are added to the user repository 26 of User X. The version ID 112 of the initial version may be a arbitrarily given number. The history management table 32 reflects the user repository 26 updated in S205 on the history management table 30.

Figure 9:
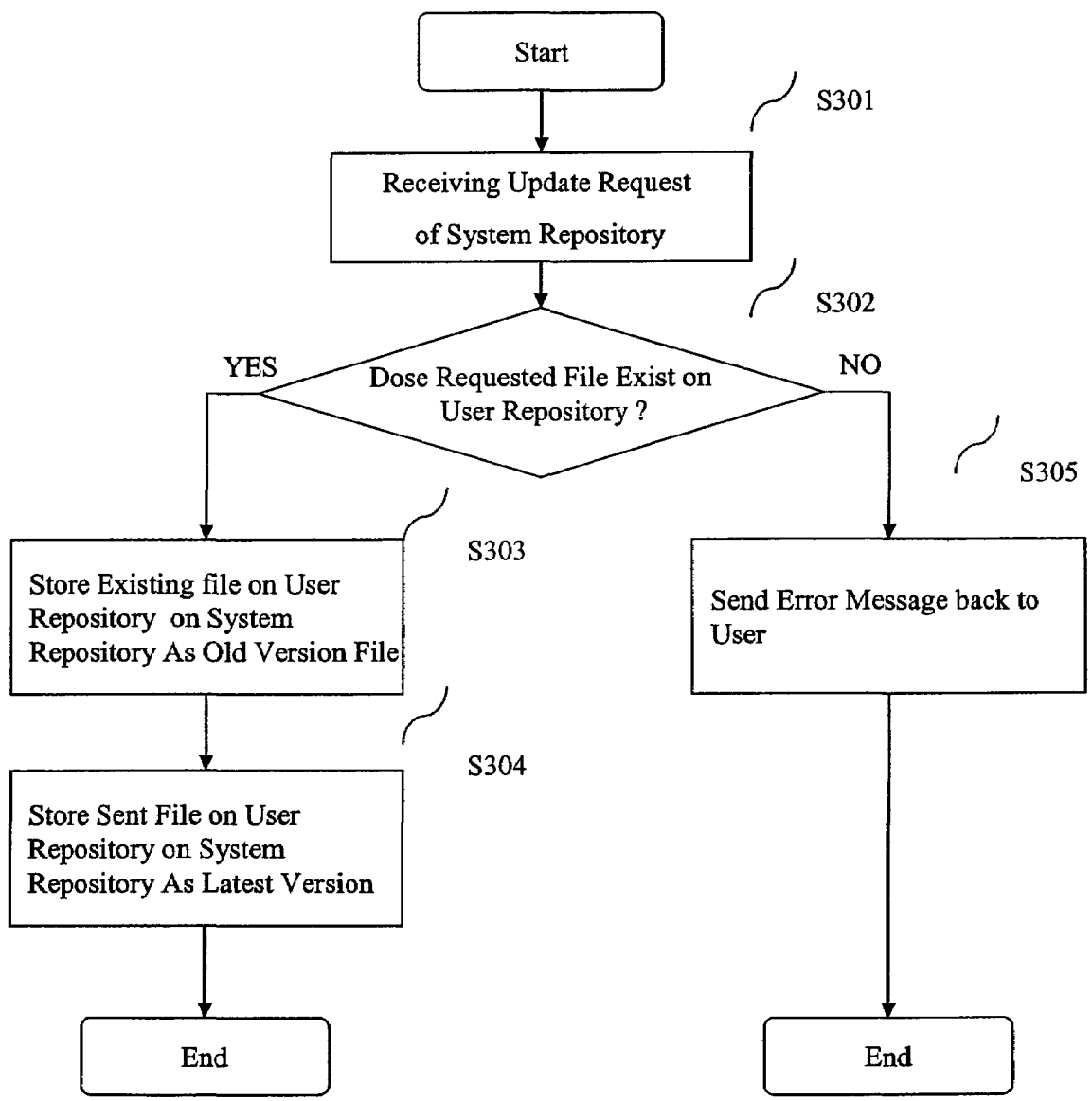
FIG. 9 is a flowchart showing the update process of the system repository according to one embodiment of the present invention.

Subsequently, updating a file to the system repository 22, which reflects the file data of the user repository 26 updated according to the processes shown in FIG. 7 on the system repository 22 (S102 and S123 in FIG. 2) will be described by referring to FIG. 9. The main of the processing in FIG. 9 is the repository server 2.

The repository server 2 receives an update request of the system repository 22 from Developer terminal 2A (S301). This update request includes a new file ID 102 which specifies the file to be updated. Upon receiving the request, the repository server 2 makes a retrieval whether or not the requested file exists on the user repository 26 (S302).

If the requested file has already existed on the user repository 26 (S302, YES), the updated version of the requested file is copied on the system repository 22. Specifically, the repository server 2 stores the existing file, which has been the latest version, as an old version on the system repository 22 (S303), and stores the file existing on the user repository 26 on the system repository 22 as an updated version (S304). These two versions stored on the system repository (i.e., the version stored in S303 and the version stored in S304) should avoid the repetition of the same version ID 112 and the same file names 120 for storing a version. The history management module 32 reflects the system repository 22 updated in S303 and S304 upon the history management table 30.

For example, FIG. 8D shows an example where the user repository 26 of User X is reflected on the system repository 22. Specifically, version 1.1 of system repository 22 is stored as an old version (S303), version 1.2 of the system repository 22 is copied from the user repository 26 of User X (S304).

On the other hand, if the requested file does not exist on the user repository 26 (S302, NO), the repository server 2 sends an error message that no update can be performed to Developer terminal 2A (S305).

Figure 10:
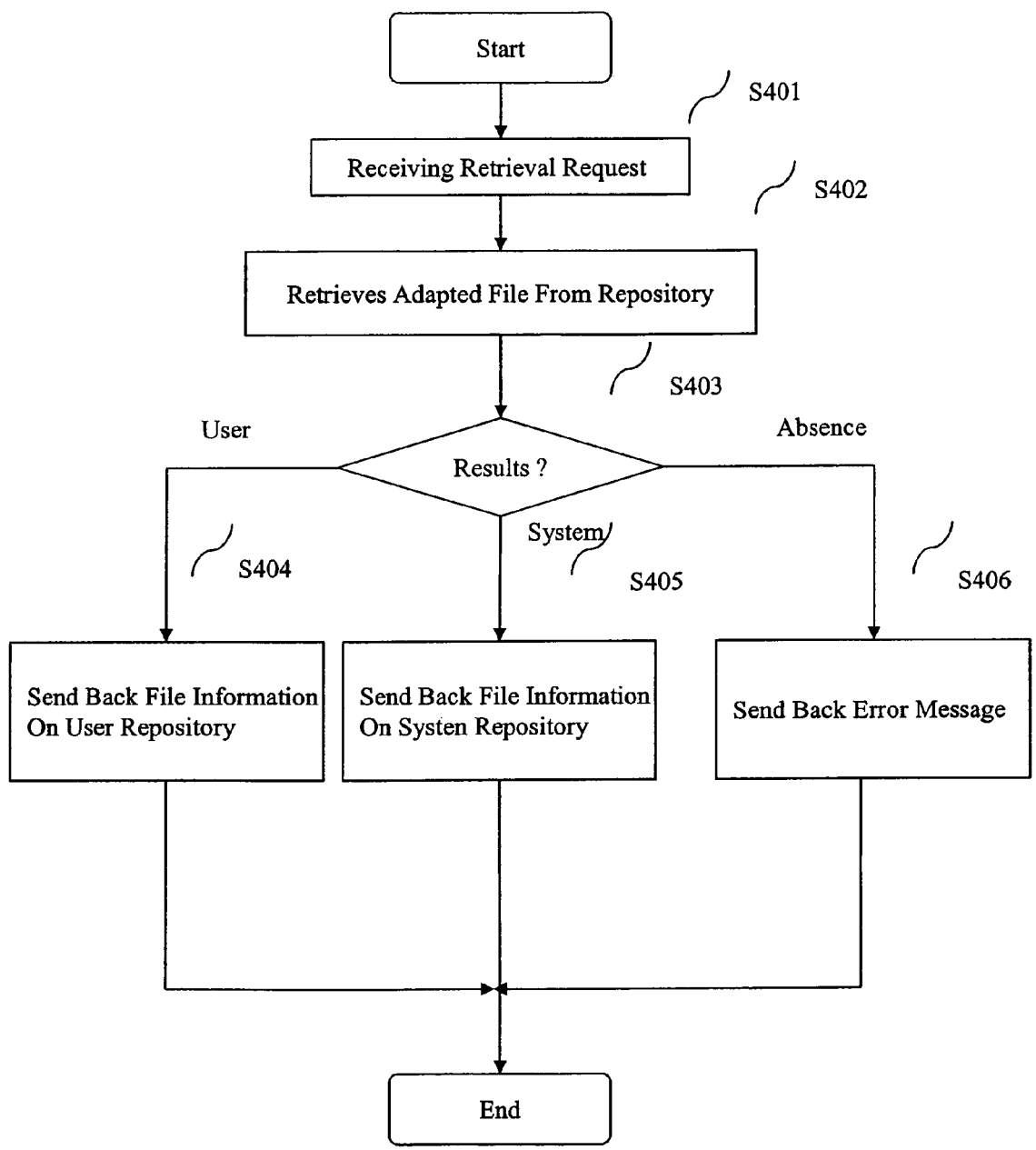
FIG. 10 is a flowchart showing the retrieval process the system repository according to one embodiment of the present invention.

Referring to FIG. 10, retrieval of the file from the system repository 22 updated in the processes of FIG. 9 will be described (S103, S113, and S124 in FIG. 2). The main of the processing in FIG. 10 is the repository server 2.

The repository server 2 receives a retrieval request from User terminal 2B (S401). The retrieval request contains the file ID 102, and may contain the version ID 112 to be retrieved. On receiving the request, the repository server 2 retrieves the file adapted to the retrieval conditions from the repository (user repository 26 and the system repository 22 (S402)). The retrieval conditions contained in the retrieval request include, for example, the following three conditions:

The first retrieval condition is a retrieval condition that the file ID 102 is used as a key to list up all recorded versions corresponding to the file ID 102. Applying to the command of UNIX®, this retrieval condition corresponds to an operation where time and date, owner, and attribution of the updated file are displayed by "1s" command.

The second retrieval condition is a condition that the file ID 102 and the version ID 112 are used as keys to judge where or not a version corresponding to the file ID 102 and to the version ID 112 presents (i.e., whether or not the file entry 100 of the file ID 102, which is a key, possesses the version entry 110 of the version ID 112, which is a key).

The third retrieval condition is a condition that a file name is used as a key instead of the file ID 102 to send back the contents of the file when the file name for storing a version 120 corresponding to the file name is stored on the repository. This retrieval condition indicates the of the contents of the file and corresponds to an operation that the user terminal 1 open the file by an editor software.

If the file adapted to the retrieval conditions is found from the user repository 26 as a result of the retrieval (S403: User), the repository server 2 sends the file information on the user repository 26 to User terminal 2B in a form adapted to the retrieval conditions specified in S402 (S404).

If the file adapted to the retrieval conditions is found from the system repository 22 as a result of the retrieval (S403: System), the repository server 2 sends the file information on the system repository 22 to User terminal 2B in a form adapted to the retrieval conditions specified in S402 (S405).

If the files adapted to the retrieval conditions are found both on the system repository 22 and the user repository 26, the repository server 2 may send back both files or may send back any one (for example, the user repository 26) in preference.

On the other hand, if no file adapted to the retrieval conditions is found as a result of retrieval (S403, Absence), the repository server 2 sends an error message that no file is found to User terminal 2B (S406).

The abstracts of the embodiment having been described are as follows:

The repository server 2 possesses the operating system 10 and the storage media 16 for storing data. The operating system 10 possesses the history management table 30 within the storage media 16, the history management table 30 possesses at least one information comprising a set of a file name of the file recognized by a given user, a file name really stored within the storage media 16, and a user identification data as for a given file. As described above, the repository server 2 can necessarily keep the file history at a time of updating a given file.

The repository server 2 possesses two repositories within the storage media (the user repository 26 and the system repository 22). These repositories each stores at least one file entry 100, and the file entry 100 possesses one file name, and a plurality of version entries 110. Each version entry 110 has a version ID 112 for identifying the file version uniquely, an updated time and date 114 indicating the time and date of update, an updater identification data 116 indicating the user who has updated the file, and a file name for storing a version 120 indicating the file name which stores the version of file.

This makes it possible for the repository server 2 to manage the version of update file independently updated by users utilizing the user repositories 26. Also, the repository server 2 can manage the file version common to all users utilizing the system repository 22.

The repository server 2 has an area (updater comment 118) on which arbitrary character string can be set by the updated user at the time of updating a file.

Upon receiving an update request of the user repository 26 from the user terminal 1, the repository server 2 updates the user repository 26. Specifically, when a given user updates a file within the storage media 16, the operating system 10 stores the conventional file on the storage media 16 as it is, and stores a new file as an alias, while in the information concerning the file within the history management table 30, the information of the file name really stored is saved as other name.

The updating a file to the user repository will be descried in a specific manner. When the user requests to write a file, the repository server 2 receives the file name of the requested file, refers the history management table 30 to retrieve an entry which accords the user name with the requested file.

If the entry exists, the repository server 2 stores the file indicated by the real file name of the entry as another file name not so as to overwrite the existing file, while changing the file name of the new file sent from the user to the file name indicated by the real file name of the entry, which is stored. The repository server 2 further changes the file name for storing a version 120 into the file name, which has been changed in the foregoing step, in the entry corresponding to the old version file of the user repository 26, and postcribes a new version entry 110 onto the user repository 26. The repository server 2 also sets a version ID 112 having a value higher than the version ID 112 of the old file within the version ID 112 area, sets the time and date when being updated within the time and date area 114, sets a user identification data of the user who has instructed the update within the updater area 116, provide character strings set by the user who has instructed the update within the updater comment area 118, and sets the really stored file name within the area of the file name for storing a file.

On the other hand, if no entry exists, the repository server 2 stores a new file sent from the user on a directory tree, and postcribes a new entry onto the history management table 30. The repository server 2 sets a user identification data of the user who has requested to write the file on the area of the user name, sets a file name recognized by the user, and sets a real file name as the file name at the time of being stored on the directory tree.

Upon receiving the request to reflect the file from the user repository 26 to the system repository 22 from the user terminal 1, the repository server 2 performs reflection processing (synchronization with other users). Specifically, when a given user requests to synchronize a file with other user, the repository server 2 receives the file name where the synchronization with other user has been requested from the user, and retrieves an entry which accorded with the user name and the requested file name from the history management table 30.

If the entry exist, the repository server 2 changes the file name of the file indicated by the real file name of the entry as another file name not so as to overwrite the file, while storing the file name of the new file newly written as a name different from the existing file. The repository server 2 further changes the file name for storing a version 120 possessed by the entry of the user repository 26 corresponding to the file of the old version into a different file name, changing the file name for storing a version 120 possessed by the entry of the system repository 22 corresponding to the file of the old version into a different file name, and postcribing a new version entry 110 on the system repository 22.

The repository server 2 also sets a version ID 112 having a value higher than the version ID 112 of the old file within the version ID area, sets the time and date when being updated within the time and date area 114, sets a user identification data of the user who has instructed the update within the updater area 116, provides character strings set by the user who has instructed the update within the updater comment area 118, and sets the really stored file name within the area of the file name for storing a file.

On the other hand, if no entry exists, the repository server 2 stores a new file send from the user on a directory tree, and deletes the entry from the history management table 30.

The repository server 2 receives a request for loading a file having been registered on the system repository 22 by the user terminal 1, and retrieves a file adapted for the request to perform a loading. Three examples of loading are described as follows:

The first loading is as follows: The repository server 2 receives a file name requested to be loaded from a user, and retrieves the entry accorded with the requested file name by referring to the history management table 30. If the entry exists, the repository server 2 loads the file indicated as the real file name of the entry from the directory tree and sends the information back to the user, while if it does not exist, the repository server 2 loads the file indicated by the requested file from the directory tree, and sends the information back to the user.

The second loading is as follows: The repository server 2 receives a file name requested to refer the history from the user, and retrieves the entry accorded with the requested file name by referring to the history management table 30. If the entry exists, the repository server 2 returns all of the version entries 110 on the user repository 26 accorded with the file name to the user, while if it does not exist, the repository server 2 the repository server returns all of version entries 110 on the system repository 22 having the file name accorded with the file name requested by the user.

The third loading is as follows: Upon receiving a request for loading the contents of the old version or their information, the repository server 2 receives the requested file name from the user and then retrieves the entry accorded with the requested file name from all of the entries in the history management table 30. If the entry exists, the repository server 2 loads the user repository 26 concerning the file registered on the entry, and retrieves the version entry 110 (hereinafter referred to as version entry 110) having the version ID 112 accorded with the version ID 112 requested by the user from the user repository 26 or the system repository 22. If the version entry 110 exists, the repository server 2 loads the file indicated by the file name for storing a version 120 possessed by the version entry 110 from the directory tree, and returns the contents or information of the file to the user.

The processing to access the repository may be performed by inputting a special command such as the CVS command to the user terminal 1, or indirectly inputting a command to the user terminal 1 in such a manner the command is embedded into the existing edition tool, for example, according to the procedure described by in Nanjing, China: "An Adaptive Version-Controlled File System", Proceedings of The Forth International Symposium on Future Software Technology (ISFST'99), pp. 36-41, Oct. 27-29, 1999.

According to the computer system of this embodiment described above, users can surely keep the file history only by a file operation without learning how to use the version management system. According to this embodiment, even if a given user temporarily stores a file, which is under editing, the same file of other user is not substituted and, at the time when the given user make a reflection request, the same file of other user is substituted with new one for the first time. Consequently, there is no case that due to temporary storage of a given user, other user frequently stops the edition, making it possible to enhance development efficiency.

The present invention having been described above is not restricted to the embodiment described above, and many modification, and alternation can me made without deviating from the scope and sprits of the present invention (see FIG. 1 or such).

For example, the repository server 2 may have the system repository 22 and the user repository 26 on the existing directories. Specifically, the repository server 2 may be configured so that the user repository 26 and the system repository 22 are stored on one file system 12 (one directory tree).

FIG. 11 shows a configuration of a file system 12 where the system repository 22 and a plurality of the user repositories 26 are allocated onto one file system tree, where FIG. 11A shows the system repository 22 and FIG. 11B shows the user repository 26.

The directory "/" shows the root directory of the system repository 22, and the directory "/.shadow/" shows the root directory of the user repository 26. Each of the user repositories 26 is configured below the directory "/.shadow/", e.g., the user repository of User X is defined to be the directory "/.shadow/X/". In such a configuration, since the user repository 26 is created as a file with hidden attribute starting from "." (dot), it is not conflicted with the existing repository system, which has already been under operating. This makes it possible to continuously operate the system repository without stopping the existing repository system.

In order to backup an old version file, which is not the latest version, the repository server 2 may create a special directory for storing the old version. For example, the directory "/.old/" shown in FIG. 11 makes up the root directory for storing the history management of the system repository, old version files are stored below this root directory. Similarly, the directory "/.shadow/X/.old/" makes up the root directory for storing the history management of the user repository 26 of User X.

In FIG. 11, the history management function is incorporated in the file system 12, the history management is operated at the same time according to the file operation. At this time, the file stored on the storage device has the root directory, which is a parent directory of all files, and the root directory possesses the root directory for the system for storing files common to all users and the root directories for individual users inherent to the individual users for storing files independently updated by individual users. For each user, only by allowing the root directory inherent to the user and the directories below the directory inherent to the user to be recognized, the file independently updated by the user is not allowed to be shown by other users. The computer system according to this embodiment having such a configuration has the following features.

The repository server 2 possesses the root directory, which is a parent directory of all files, and the root directory possesses the root directory for the system for storing files common to all users and the root directories for individual users inherent to the individual users for storing files independently updated by individual users. Only the root directory inherent to the user and the directories below the directory inherent to the user allow to be recognized by the user. At the initial state, the same files as those of the root directory of the system are stored on the root directory inherent to the user.

The repository server 2 has a file system repository for storing the update history of the file stored on the directory tree below the root directory of the system, the file system repository has at least one version entry. As shown in FIG. 5, the version entry 110 has the version ID 112, the update time and date 114, which records the time and date of updating file, the user identification data (updater 116), showing the user who has updated the file, the updater comment 118, which stores text information arbitrarily created by the updater, and a pointer (the file name for storing a version 120). The version entry 110 are created per every updating a file below the root directory of the system, and is postscribed on the file system repository.

The repository server 2 also possesses a repository for storing the history, which stores the update history of the files each stored on a directory below the root directory of the system. The repository for storing the history comprises a pointer to the root directory, and a plurality of the version entries 110. Each version entry 110 possesses the files within the root directory of the system and the update time and date 114 showing the time and date of updating file, the updater 116, showing the user who has updated the file, and a pointer of this version to the root directory of the system.

The repository server 2 can manage the version of the root directory by using this repository for storing the history. The version entry 110 within the repository for storing the history may have an area on which the updated user can set arbitrary character sting at the time of updating the file.

Upon receiving the update request of the user repository 26 from the user terminal 1, the repository server 2 updates the file. Specifically, when one user updates a file within the root directory of the system, the file, the directory having the file all of the directories corresponding to the parent directory of the directories are copied to the root directory inherent to the user, and the update is made to the copied file.

Upon receiving the request for reflecting the update from the user directory 26 to the system directory 22 from the user terminal 1, the repository server 2 processes the reflection (synchronization with other users). Specifically, when the file update by the user is reflected on the root directory of the system, the root directory inherent to the user is copied as a directory of a new system, the root directory of the system possessed by this root directory is changed to the root directory of the new system created as just mentioned, and a new version entry 110 is created on the system repository 22. The operating system 10 sets the time and date when the file is reflected by the user on the area of the updater 114 as for the new version entry 110, sets the user identification data of the reflected user on the area of the updater 116, and sets the root directory of the system before updating on the area of the pointer showing the storage site of the root directory of the system.

Upon receiving the request for loading a file registered on the system repository 22 from the user terminal 1, the repository server 2 retrieves the file adapted to the request, and performs the loading. Specifically, when one user makes a file operation command to the repository server 2 by specifying the file name, Step (1): The repository server 2 refers the root directory and further refers the directory inherent to the user;

Step (2): The repository server 2 further retrieves the lower hierarchical directories within the directory inherent to the user to retrieve the directory accorded with the given file name;

Step (3): The repository server 2 refers the directory if the accorded file name is present; and Step (4): The repository server 2 repeats Steps (2) and (3) until the target file can be found.

The repository server 2 further extends the attribute information of inode to configure the repository. Specifically, the storage media 16 (for example, a disk) stores a plurality of inodes 1205 to 1213, which are managed by the file system 12, and which stores the information concerning files. Inodes comprise information for file management mainly in UNIX® type operation system. Each inode exists with corresponding to a file at 1:1, and stores the owner of the file, time and date of creation, attribute, and others. As for detail of filing system of UNIX® operating system, see Daniel P. Povet Marco Cesati ed. "Understanding the Linux Kernels 2nd Edition", published by O'Reilly. Media. Inc. While UNIX® type operating system has been exemplified in this embodiment, it should be noted that this embodiment does not depend on UNIX®, since operating systems other than UNIX® type similarly manage files by similar data configuration.

Since the inode corresponds to a file at 1:1, it has a reference relationship resembling the directory tree. Specifically, if a plurality of files are stored on a given directory (the file system treats the directory as a file having a special attribute), a pointer corresponding to the inode of the file is stored on the inode. The pointer means an address for indicating a specific location of the data area. Specifically, the pointer to the inode of the stored file means that the data of the inode of the stored file exists on the location indicated by the pointer.

Figure 12:
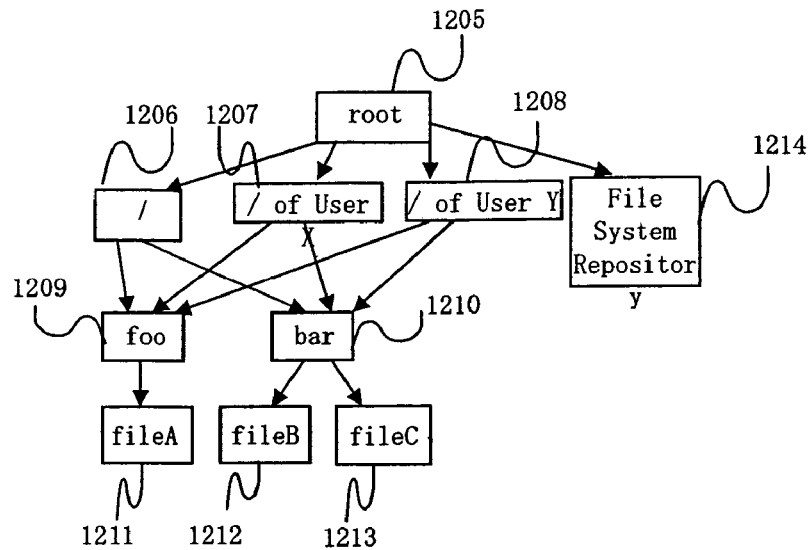
FIG. 12 shows a configuration of an inode file system according to one embodiment of the present invention.

In FIG. 12, the inode 1206 of the directory "/" points the inode 1209 of the directory "foo". This means that the directory "foo" is stored on the directory "/". Similarly, the directory "bar" is also stored on the directory "/". Furthermore, the inode 1209 of the directory "foo" points the inode 1211 of file "file A". This means that "file A" is stored on the directory "foo". Similarly, it means that "file B" and "file C" are stored on the directory "bar". Up to this the data construction is similar to that of the file system of the conventional operating system.

As the data construction characterized in this embodiment, there can be mentioned root inode 1205, an inode 1207 of "/" of User X, an inode 1208 of "/" of User Y, and the file system repository 1214. The present invention is a technique that a virtual directory tree is shown per a user, so as to avoid that the operating system reflects the modification of a file by one user on another user. Consequently, it is required to produce "/" per user. For this reason, the operating system produces the inode 1207 of "/" of User X and the inode 1208 of "/" of User Y. These inode 1207 of "/" of User X and inode 1208 of "/" of User Y point the inode of directory or file existing on the directory tree corresponding to the directory tree recognized by the corresponding user, respectively.

If the inode 1207 of "/" of User X, the inode 1208 of "/" of User Y, and the inode 1206 of the directory "/" exist independently, when the user terminal 1 gives a file name, the operating system cannot make a retrieve. For this reason, an inode, which points these three inodes, is required. In this embodiment, such an inode is called root inode 1205.

A server 1201 possesses a file system repository for controlling information concerning the file update history. Since the file system repository is also a file, it possesses an inode 1214 of the file system repository.

Figure 13:
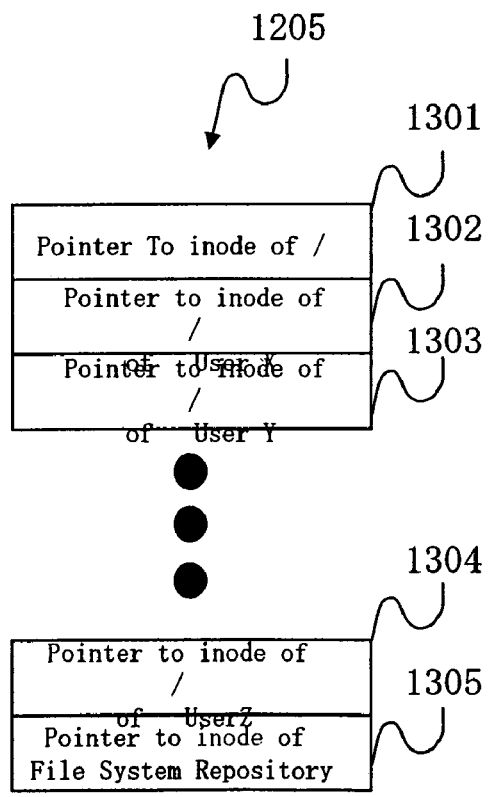
FIG. 13 shows a configuration of the root node according to one embodiment of the present invention.

FIG. 13 shows the construction of the root inode 1205. The root inode 1205 comprises a pointer 1301 to the root inode of the system, pointers 1302-1304 to root inodes for individual users, and a pointer to the file system repository inode.

Figure 14:
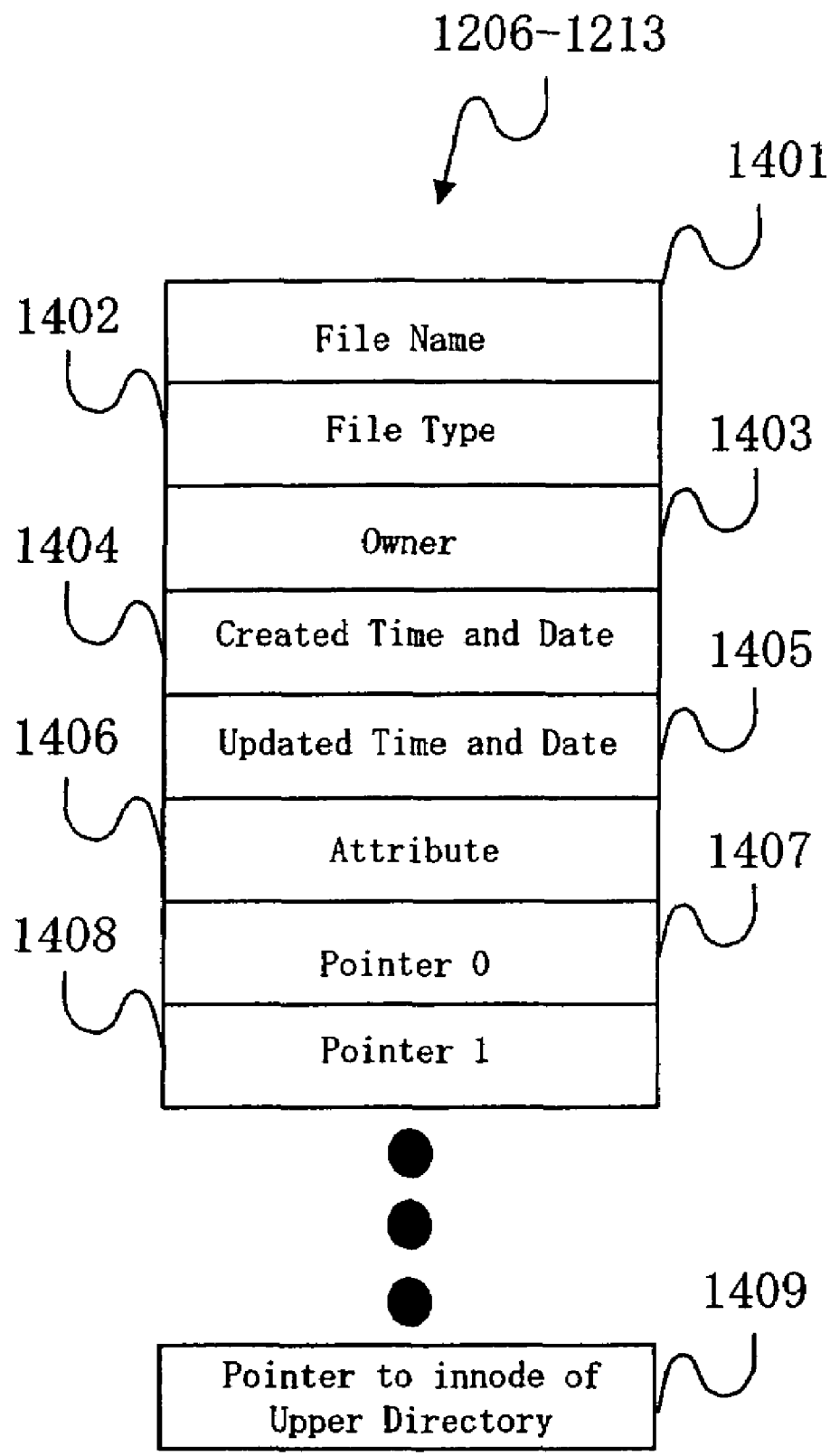
FIG. 14 shows a configuration of nodes other than the root node according to one embodiment of the present invention.

FIG. 14 shows construction of the inodes 1206-1213 other than the root. The inodes 1206-1213 other than the root comprise a file name 1401, a file type 1402, an owner 1403, a creation time and date 1404, an update time and date 1405, an attribute 1406, pointers 1407 to 1408, and a pointer 1409 to the inode of upper directory. The file type 1402 shows whether the inode is a directory or a general file.

The owner 1403 is the owner of the inode. The creation time and date 1404 shows the time and date when the inode is newly created. The update time and date 1405 shows the time and date when the inode is finally updated. As for the pointers 1407 to 408, if the file type 1402 is a directory, the pointer to the file inode existing within the directory is stored, and if the file type 1402 is a general file, the pointer to the data block, which is the contents of the file, is stored. The pointer 1409 to the inode of upper directory is a pointer to the inode of the parent directory having this inode as a subdirectory.

Receiving a file name and a file operation command form the user terminal 1, the file system 12 refers the root inode 1205, the file system 12 recursively retrieves the directory shown by the pointer to load the inode of the target file. When User X sends a file operation command to the file system 12, the file system 12 refers the pointer 1302 to "/" of User X to load the inode 1207 of "/" of User X. As described above, the file system 12 can real different directory trees depending upon users. The user terminal 1 is never conscious of the fact that the directory trees are different from users.

Figure 15:
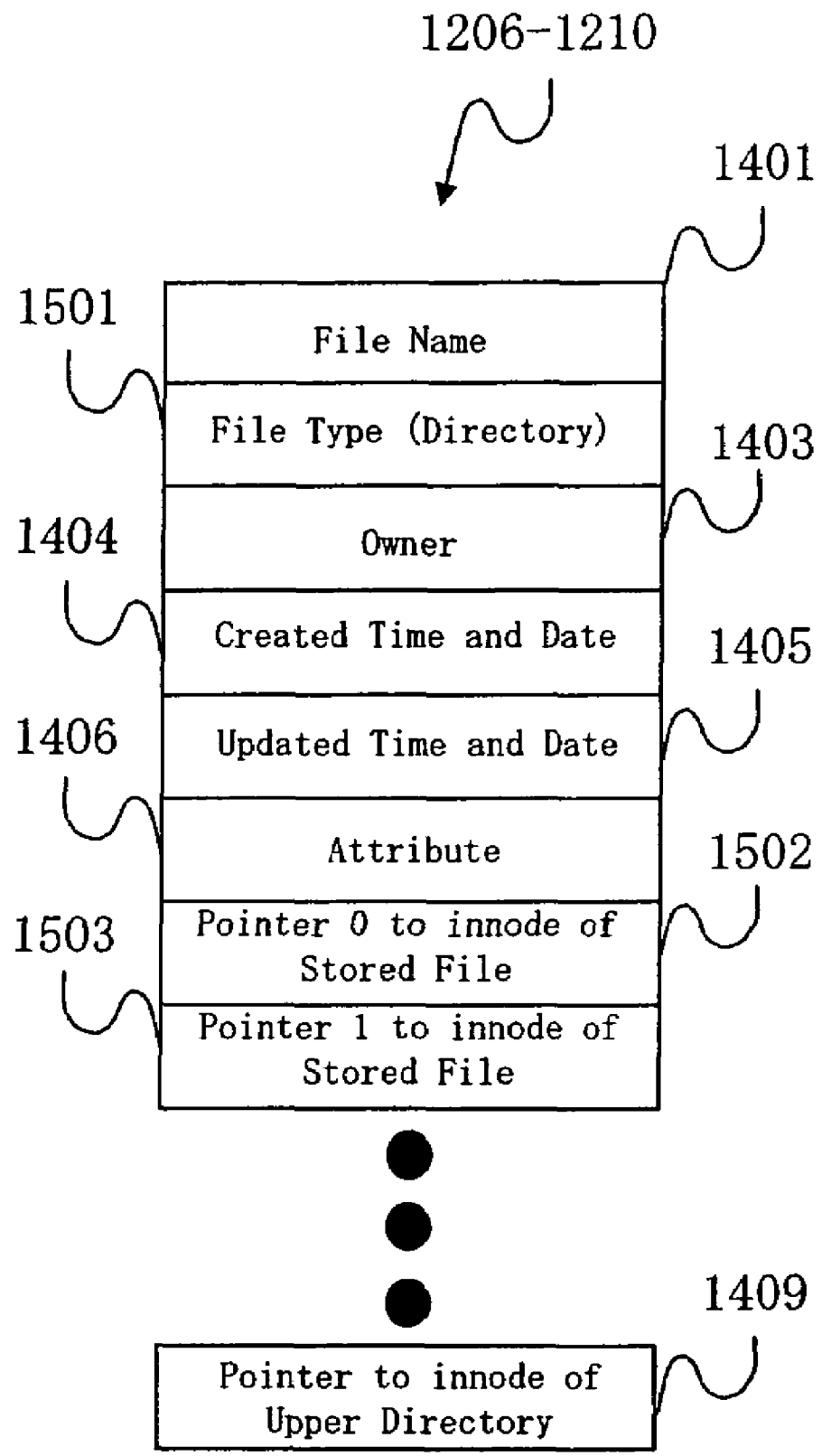
FIG. 15 shows directory nodes other than the root according to one embodiment of the present invention.

FIG. 15 shows the construction of directory inodes 1206 to 1210 other than the root directory. On a file type 1501 (corresponding to the file type 1402) is stored an identification data showing that it is a directory stored thereon. On pointers 1502 and 1503 (corresponding to the pointers 1407 and 1408) are stored pointers to the file inode existing within this directory.

Figure 16:
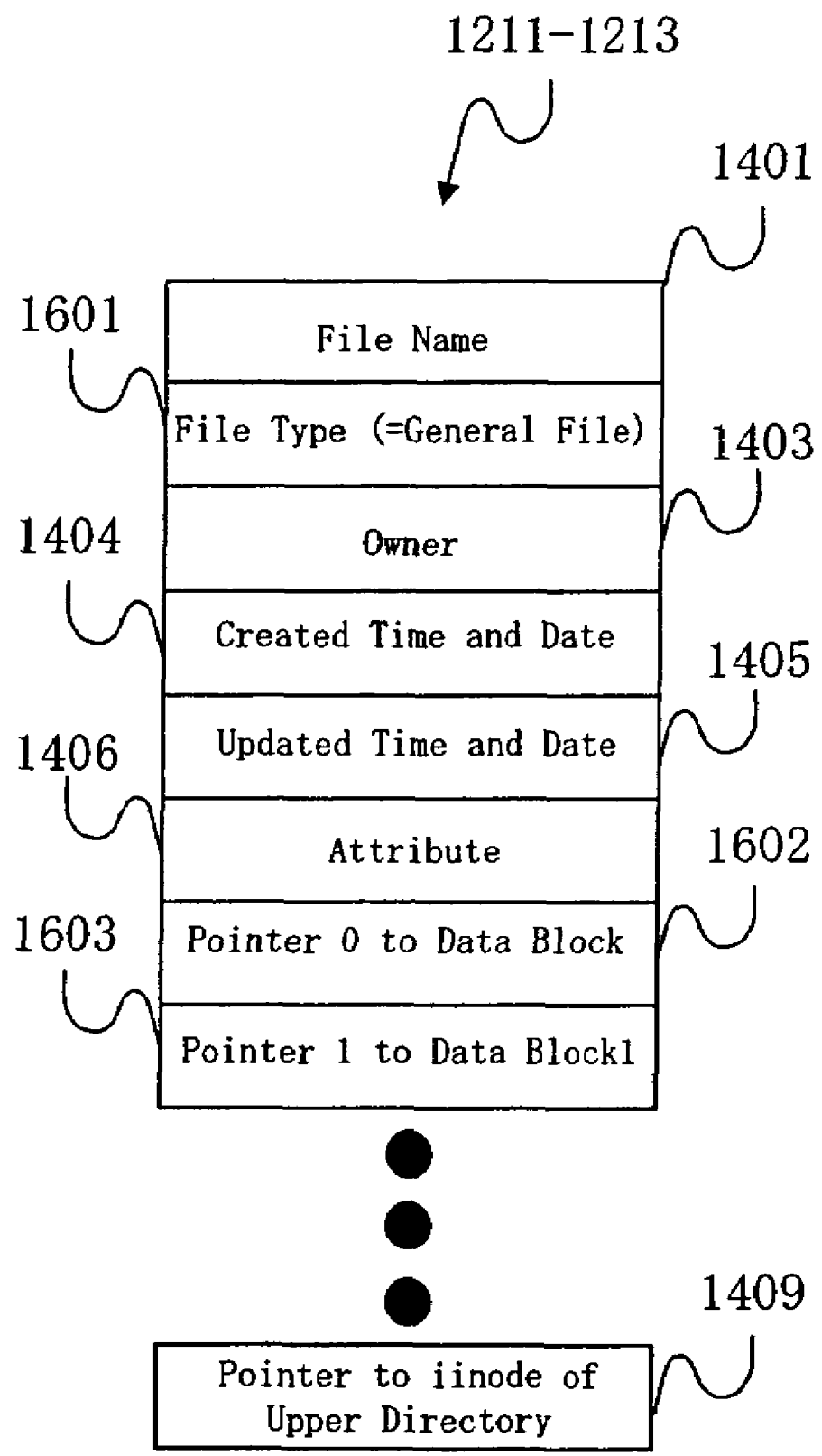
FIG. 16 shows a configuration of the file node according to one embodiment of the present invention.

FIG. 16 shows a construction of the file inodes 1211 to 1213. On a file type 1601 (corresponding to the file type 1402) is stored an identification data showing that it is a file stored thereon. On pointers 1602 and 1603 (corresponding to the pointers 1407 and 1408) are stored pointers to the data block, which are contents of the file.

Figure 17:
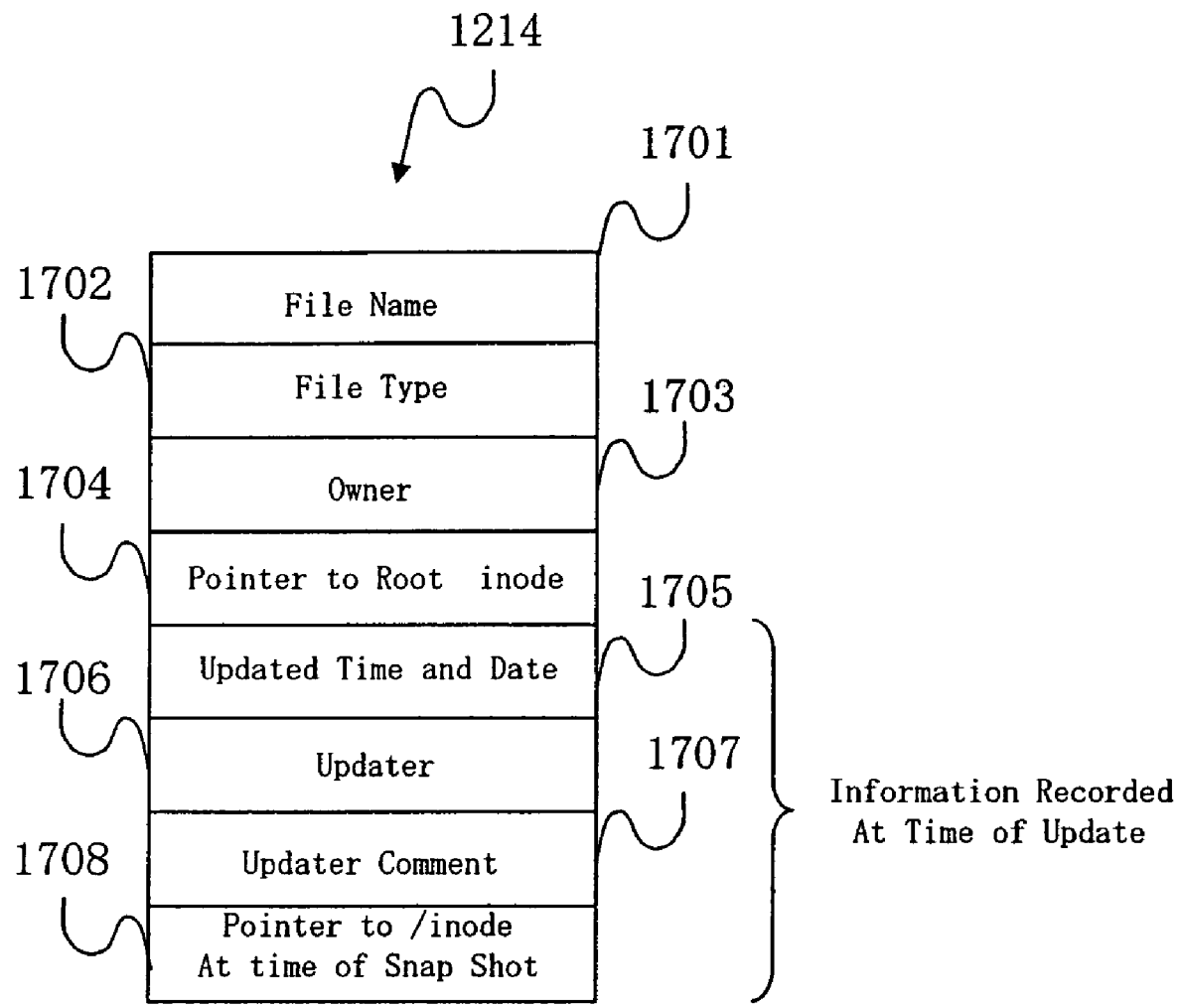
FIG. 17 shows a configuration of the file system repository according to one embodiment of the present invention.

FIG. 17 shows a construction of the inode 1214 of the file system repository. The inode 1214 of the file system repository comprises a file name 1701, a file type 1702, an owner 1703, a pointer 1704 to the root inode, and a plurality of information concerning file update history. The information concerning file update history comprises an update time and date 1705, an updater 1706, a updater comment 1707, and a pointer 1708 to the "/" inode at the time of snap shot (pointer to an upper directory inode).

The file type 1702 shows the inode is a directory or a general file. Since the inode of the system repository 1214 is a directory, the file type 1702 stores an identification data showing to be a directory.

The owner 1703 is the owner of the inode. From the viewpoint of the security, the owner of the system repository inode is preferred to be root. The pointer 1704 to the root inode stores a pointer to the root inode 1205, which is a parent directory of the system repository inode.

The update time and date 1705 is a time and date when the user terminal 1 update the file within the inode 1206 of the directory "/". The updater 1706 is a user whose updates a file within the inode 1206 of the directory "/". The updater comment 1707 stores text information concerning the version of the inode 1206 of the directory "/". The text information is arbitrarily created by the user who is indicated by the updater 1706.

The pointer 1708 to the inode of the directory "/" stores a pointer to the inode of the directory "/" in this version. Entries 1705, 1706, 1707, and 1708 constitutes one set to describe the information concerning one version of the file. Each time when the user terminal 1 updates a file, the file system 12 postscribes the set of entries 1705, 1706, 1707, and 1708.

What is claimed is:

1. A computer system comprising a repository server, which stores files to be updated whose version is managed by a repository; a user terminal, which accesses the files to be updated;

said repository server comprising:

a file system, which allows said user terminal(s) to recognize a data stored on a disk as a unit of a file;

an operating system which intermediates the access of a file system;

a device driver, which executes a control command from said file system to control storage means;

storage media, which stores data required for providing the version management service;

a file data storage module, which stores the contents of updated file, a user repository to control information concerning the history of updating a file on an area for temporary update allocated per each user;

a user repository updating module configured to only allows the allocated user to access the temporary update so that other users cannot;

a system repository to stores information concerning all files to be updated, wherein the all files to be update are open to all users;

a system repository updating module configured to reflect the temporary update on said user repository upon the system repository;

a history management table configured to associate the files between the system repository and the user repository;

a history management module configured to receives a file operation request sent from the user terminal, and depending upon the file operation request sent by the user, which loads a file and its history, the history management module writes a file and synchronizes a file with other users; and a user authentication module to authenticate the requested user terminal to determine which service is used.

* * * * *